United States Patent
De Martin

(10) Patent No.: US 8,978,878 B2
(45) Date of Patent: Mar. 17, 2015

(54) DETECTION DEVICE FOR A CONVEYOR

(75) Inventor: Lino De Martin, Croisy sur Andelle (FR)

(73) Assignee: Schneider Electric Industries SAS, Rueil Malmaison (FR)

( * ) Notice: Subject to any disclaimer, the term of this patent is extended or adjusted under 35 U.S.C. 154(b) by 58 days.

(21) Appl. No.: 13/242,738

(22) Filed: Sep. 23, 2011

(65) Prior Publication Data

US 2012/0090961 A1   Apr. 19, 2012
US 2014/0374221 A2   Dec. 25, 2014

(30) Foreign Application Priority Data

Oct. 13, 2010 (FR) ................... 10 58320

(51) Int. Cl.
*B65G 43/08* (2006.01)
*B65G 13/00* (2006.01)

(52) U.S. Cl.
CPC ............. *B65G 43/08* (2013.01); *B65G 13/00* (2013.01); *B65G 2203/042* (2013.01)
USPC ................. 198/781.05; 198/781.06

(58) Field of Classification Search
CPC ............................................... B65G 2203/042
USPC ................. 198/780, 781.05, 781.06
See application file for complete search history.

(56) References Cited

U.S. PATENT DOCUMENTS

| | | | | |
|---|---|---|---|---|
| 3,724,643 A * | 4/1973 | Kohl | | 198/787 |
| 4,240,538 A | 12/1980 | Hawkes et al. | | |
| 4,694,949 A * | 9/1987 | Nakagawa | | 198/351 |
| 5,862,907 A * | 1/1999 | Taylor | | 198/781.05 |
| 5,906,268 A * | 5/1999 | Kalm | | 198/781.06 |
| 7,007,792 B1 | 3/2006 | Burch | | |
| 7,243,784 B2 * | 7/2007 | Cotter et al. | | 198/861.1 |
| 7,823,719 B2 * | 11/2010 | Jaksic et al. | | 198/781.05 |
| 8,284,993 B2 * | 10/2012 | Taylor et al. | | 382/103 |
| 2004/0173440 A1 * | 9/2004 | Mauch et al. | | 198/781.05 |
| 2009/0120766 A1 * | 5/2009 | Markle et al. | | 198/781.05 |
| 2011/0297509 A1 * | 12/2011 | Taylor | | 198/572 |

FOREIGN PATENT DOCUMENTS

WO   WO 2006/096292 A1   9/2006

* cited by examiner

*Primary Examiner* — Gene Crawford
*Assistant Examiner* — Thomas Randazzo
(74) *Attorney, Agent, or Firm* — Oblon, McClelland, Maier & Neustadt, L.L.P.

(57) ABSTRACT

The invention relates to a detection device (2) intended to be positioned in a conveyor (1) which comprises conveying rollers (100) arranged between two lateral uprights (10, 11) to convey goods in a conveying direction (D), the device comprising:
- an elongate support extending over its length along a longitudinal axis (X), said support supporting a number of detectors (40) distributed along its longitudinal axis (X) to detect the goods borne by the conveyor (1),
- said support being intended to be positioned between two conveying rollers (100), fixed between the two lateral uprights (10, 11) of the conveyor (1), transversally relative to the conveying direction (D).

8 Claims, 2 Drawing Sheets

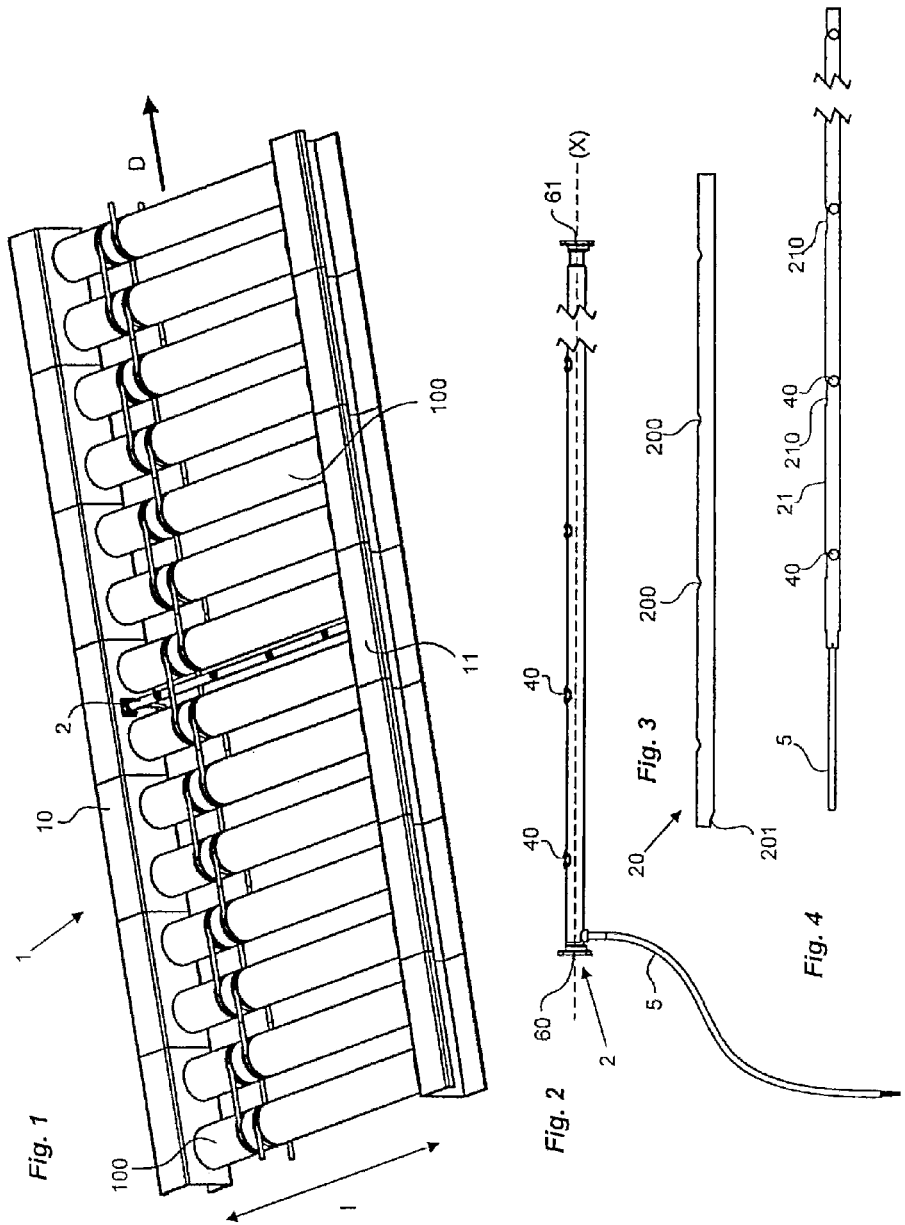

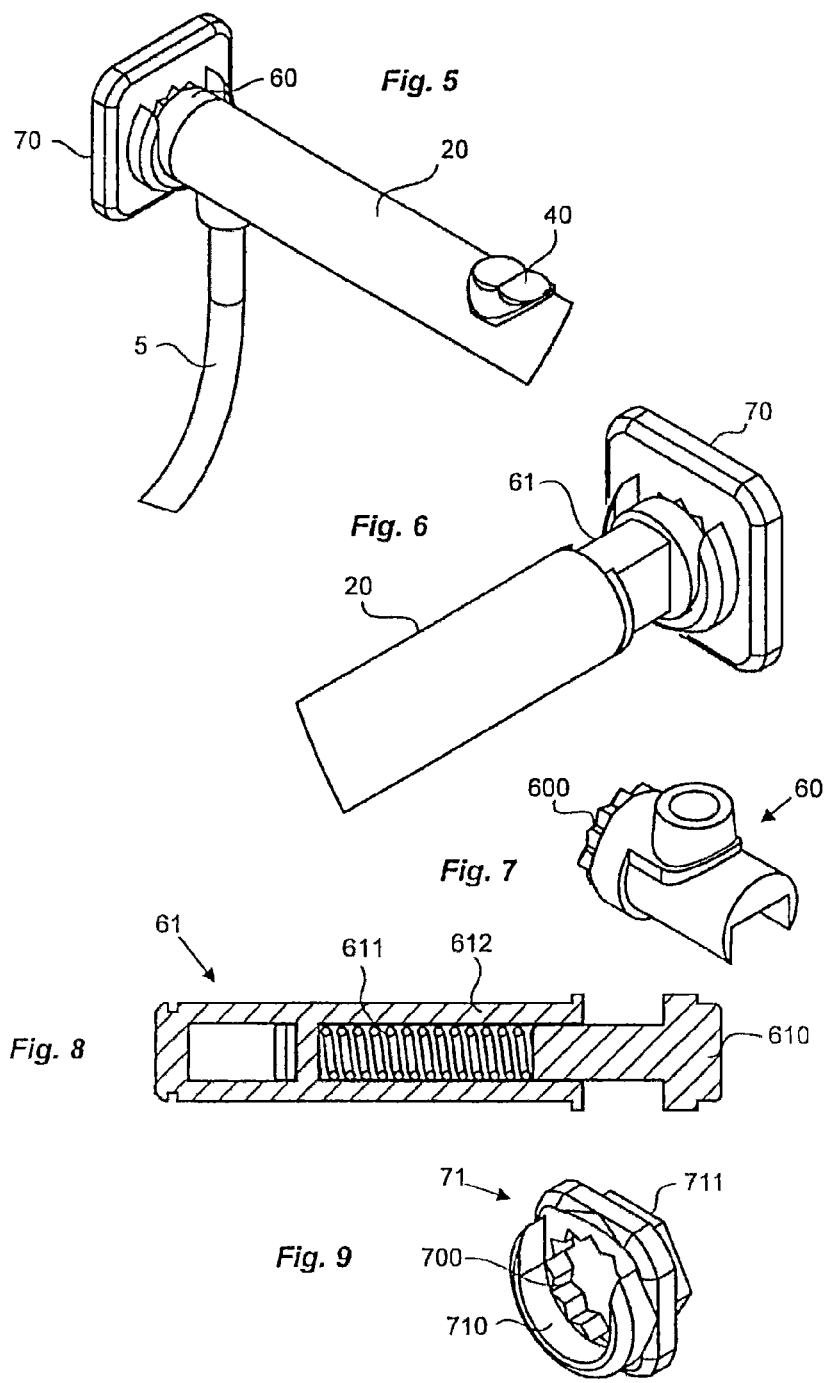

DETECTION DEVICE FOR A CONVEYOR

The present invention relates to a detection device intended to be employed to detect the passage of goods on a conveyor.

It is known practice to employ detectors to detect the passage of goods on a conveyor. A detector is, for example, positioned at a desired height relative to the conveying surface, its output being activated each time a goods item passes into its detection area.

In these solutions, the position of the detector must be chosen relative to the size of the goods item to be detected. Furthermore, a particular support for positioning the detector must often be provided. Finally, since the detector is positioned in an apparent manner, an impact may cause it to be displaced, disturbed or even degraded, resulting in a defective detection of the goods.

The document U.S. Pat. No. 4,240,538 describes a detection device employed in a conveying system positioned under the conveying rollers. This device is unsatisfactory because it does not allow for the detection of the passage of the goods item over the entire width of the conveyor.

The document EP1 855 967 describes a support on which are positioned a number of detectors, said support being positioned transversally to the conveying direction. This device is unsatisfactory because it cannot easily be incorporated in an existing conveyor without having to use specific and bulky fixing means.

In these two documents, the devices also have little protection from dust and can easily be disturbed over time.

The aim of the invention is to propose a detection device which makes it possible to detect the goods on a conveyor regardless of the size and the position of these goods, which is easy to position, which adapts to all conveyor widths and which is well protected to avoid any disturbance.

This aim is achieved with a detection device intended to be positioned in a conveyor which comprises conveying rollers arranged between two lateral uprights to convey goods in a conveying direction, this detection device comprising:
- an elongate support extending over its length along a longitudinal axis, said support supporting a number of detectors distributed along its longitudinal axis to detect the goods borne by the conveyor,
- said support being intended to be positioned between two conveying rollers, in a plane lower than the conveying surface formed by the rollers and fixed between the two lateral uprights of the conveyor, transversally relative to the conveying direction,
- the support comprising a hollow cylindrical tube into which are inserted the detectors, the tube being provided with a number of orifices distributed along its length, each detector being intended to function through an orifice of the tube.

According to another particular feature, the detection device comprises a printed circuit inserted into the tube and on which the detectors are assembled.

According to another particular feature, the detection device comprises a microcontroller assembled on the printed circuit and to which the detectors are connected.

According to another particular feature, the device comprises means for fixing the tube to the lateral uprights of the conveyor.

According to another particular feature, the fixing means comprise a length adjustment system for adapting the length of the device to the distance separating two lateral uprights of the conveyor.

According to another particular feature, the fixing means comprise means for orienting the device at different angles around the longitudinal axis.

According to another particular feature, each detector is of photoelectric or ultrasound type.

The invention also relates to a conveying system comprising:
- a conveyor provided with a number of conveying rollers arranged between two lateral uprights to convey goods in a conveying direction,
- a detection device as defined hereinabove, said detection device being positioned between two conveying rollers in a plane lower than a conveying surface formed by the rollers and fixed between the two lateral uprights of the conveyor, transversally relative to the conveying direction (D).

Other features and advantages will emerge from the following detailed description by referring to an embodiment given by way of example and represented by the appended drawings in which:

FIG. 1 represents a conveyor with rollers in which the detection device of the invention is incorporated, FIG. 2 represents the detection device of the invention, FIG. 3 represents the tube of the detection device of the invention, FIG. 4 represents the printed circuit of the detection device intended to be inserted into the tube represented in FIG. 3, FIG. 5 represents in detail a first end of the detection device of the invention, FIG. 6 represents in detail a second end of the detection device of the invention, FIG. 7 represents a standard end-piece intended to seal one end of the tube of the detection device, FIG. 8 represents a specific end-piece provided with a system for adapting the length of the device of the invention, FIG. 9 represents a fixing member intended to accommodate the device on the conveyor.

The invention relates to a detection device 2 intended to detect goods moving on a conveyor 1.

The detection device of the invention is more particularly designed to be adapted to a conveyor 1 with rollers. However, it should be understood that it could equally be adapted to other types of conveyors provided that these conveyors are arranged to accommodate and operate the detection device of the invention.

With reference to FIG. 1, a conveyor 1 with rollers comprises, for example, two lateral uprights 10, 11, between which are positioned a number of rollers 100 intended to drive goods on the conveyor 1 in a conveying direction D. The rollers 100 of the conveyor 1 are, for example, all identical and positioned parallel to one another when the conveying direction D is rectilinear. If the conveying direction D is curved, the rollers 100 are oriented to follow this conveying direction.

The detection device 2 of the invention has the particular feature of being able to be installed directly within the conveyor 1, between two rollers 100 of the conveyor 1. Thus, the detection device directly uses the lateral uprights 10, 11 of the conveyor 1 as fixing support. Positioned between two rollers 100 of the conveyor, in a plane lower than the conveying surface formed by the rollers 100, the detection device 2 proves difficult to access, which protects it from external attack. Moreover, given its position, the detection device 2 of the invention, with its particular architecture, can detect the passage of the goods on the conveyor regardless of the size of the goods conveyed. The detection device 2 can be arranged parallel to the rollers of the conveyor and therefore perpendicularly to the conveying direction D, or obliquely relative to the rollers 100. Its position and its orientation are totally adaptable to the conditions or to the application.

Moreover, the detection device 2 of the invention has a particular architecture which enables it to detect the goods, regardless of their size and their position, over the entire width (I, FIG. 1) of the conveyor 1, measured between the two lateral uprights 10, 11 of the conveyor. For this, the detection device of the invention has a number of detectors 40 embedded on a same support. The detectors are, for example, spaced apart from one another by a distance less than the minimum width of the goods and each detector 40 is, for example, capable of activating the output of the device 2 independently of one another, which makes it possible to detect the passage of a goods item over the entire width of the conveyor 1. The detectors may be of photoelectric or ultrasound type. Other types of detectors may perfectly well be employed.

With reference to FIG. 2, the detection device 2 comprises a support such as, for example, a hollow cylindrical tube 20 (FIG. 3) which has two opposite ends. The tube 20 is open at each of its ends and provided with a number of orifices 200 distributed over its length, for example every ten centimeters. The length of the tube 20 is chosen so that the detection device can be extended over the entire width (I) of the conveyor 1.

With reference to FIG. 4, the detection device 2 also comprises a printed circuit 21 that has an elongate profile in order to be able to be inserted into the tube 20 represented in FIG. 3. The detection device 2 comprises electronic circuits assembled on the printed circuit 21. These electronic circuits comprise in particular a power supply block and a microcontroller for processing the detection signals. Each detector is also assembled on the printed circuit 21 and connected to the electronic circuits and in particular to the microcontroller. The detectors are distributed along the printed circuit 21 so as to each coincide with an orifice 200 formed through the tube 20 of the device when the printed circuit 21 is inserted therein. According to the invention, the printed circuit 21 has the particular feature of having notches 210 distributed over its length, enabling the printed circuit 21 to be easily cut in order to adapt its length to that of the tube 20 and therefore choose the number of detectors to be inserted into the detection device 2.

A cable 5, for example with three wires, comprises the wires intended for the power supply to the electronic circuits and the detectors and at least one wire for the output signal from the device, this wire being connected to the microcontroller. The output may be of PNP or NPN or PNP and NPN type. The cable 5 is connected to the printed circuit 21 so as to present a radial output. To facilitate the radial output of the cable 5, the tube 20 has a recess 201 at one of its ends. The cable 5 may include a fourth wire connected to the microcontroller and intended to receive an input signal possibly employed to produce a chain of devices by connecting the output of one device to the input of an adjacent device. In this way, the microcontroller of each device activates its output which makes it possible to control the progress of the goods on the conveyor in conditions in which they do not come into contact with one another.

With reference to FIGS. 5 and 6, at each end of the tube 20, the device comprises an end-piece 60, 61 intended to seal the tube 20. The two end-pieces 60, 61 are configured to be positioned in a fixing member 70, 71 mounted on the two lateral uprights 10, 11 of the conveyor 1. The fixing members 70, 71 may take different forms depending on the type of fixing employed on the lateral uprights of the conveyor. In FIG. 9, the fixing member 71 comprises, for example, a part 710 for accommodating an end-piece 60, 61 of the device and a hexagonal shape 711 intended to be inserted into a hexagonal orifice produced through the lateral upright 10, 11 of the conveyor 1. Each fixing member may include notches 700 (FIG. 9) that are angularly spaced and intended to cooperate with corresponding notches 600 produced on each end-piece 60, 61 of the detection device 2. This notch mechanism makes it possible to be able to give different orientations to the device 2 about its longitudinal axis (X).

According to the invention, the end-piece 61 represented in FIG. 8 comprises an elastic system enabling the device 2 to adapt its length to the width (I) of the conveyor 1. The end-piece 61 comprises, for example, a piston 610 mounted to bear against a spring 611 to be moved inside a sleeve 612.

Obviously, it is possible, without departing from the framework of the invention, to imagine other variants and refinements of detail and even consider the use of equivalent means.

The invention claimed is:

1. A detection device positioned in a conveyor that includes conveying rollers arranged between two lateral uprights to convey goods in a conveying direction, the detection device comprising:
    an elongate support extending along a longitudinal axis, said support supporting a number of detectors distributed along the longitudinal axis to detect the goods conveyed by the conveyor,
    said support positioned between two conveying rollers in a plane lower than a conveying surface formed by the rollers and ends of the support fixed to respective fixing members mounted to the two lateral uprights of the conveyor transversely relative to the conveying direction, the fixing members including first notches on an interior portion thereof,
    said support including:
        a hollow cylindrical tube into which are inserted the detectors, the tube being provided with a number of orifices distributed along a length of the tube, each detector positioned through one of the orifices of the tube, and
        end pieces at each of the ends of the support, the end pieces including second notches that are angularly spaced and correspond to the first notches of the fixing members, the first and second notches fixing the support to the uprights at a plurality of orientations to fix the detectors about a longitudinal axis of the support.

2. The device according to claim 1, further comprising:
    a printed circuit inserted into the tube and on which the detectors are assembled.

3. The device according to claim 2, further comprising:
    a microcontroller assembled on the printed circuit and to which the detectors are connected.

4. The device according to claim 1, wherein at least one of the end pieces include a length adjustment system to adapt a length of the device to a distance separating two lateral uprights of the conveyor, the length adjustment system including a spring within the at least one end piece the bears against a movable piston.

5. The device according to any of one of claims 1 to 3, wherein each detector is of a photoelectric type.

6. The device according to any one of claims 1 to 3, wherein each detector is of an ultrasound type.

7. A conveying system comprising:
    a conveyor provided with a number of conveying rollers arranged between two lateral uprights to convey goods in a conveying direction, the conveyor including:
        a detection device positioned in a conveyor that includes conveying rollers arranged between the two lateral uprights to convey the goods in the conveying direction, the detection device comprising:

an elongate support extending along a longitudinal axis, said support supporting a number of detectors distributed along length longitudinal axis to detect the goods conveyed by the conveyor, said support positioned between two conveying rollers in a plane lower than a conveying surface formed by the rollers and ends of the support are fixed to respective fixing members mounted to the two lateral uprights of the conveyor transversely relative to the conveying direction, the fixing members including first notches on an interior portion thereof, said support including:

a hollow cylindrical tube into which are inserted the detectors, the tube being provided with a number of orifices distributed along a length of the tube, each detector positioned through one of the orifices of the tube, and end pieces at each of the ends of the support, the end pieces including second notches that are angularly spaced and correspond to the first notches of the fixing members, the first and second notches fixing the support to the uprights at a plurality of orientations to fix the detectors about a longitudinal axis of the support.

8. The device according to claim 1, wherein the means for fixing includes end-pieces at the respective ends of the support and fixing members mounted on each of the two lateral uprights, the respective end-pieces configured to be positioned in the respective fixing members.

* * * * *